US008902967B2

(12) United States Patent
Alexandrov

(10) Patent No.: US 8,902,967 B2
(45) Date of Patent: Dec. 2, 2014

(54) SYSTEMS AND METHODS FOR DISTRIBUTED MEDIA STREAM TRANSCODING AND SHARING

(75) Inventor: Albert Alexandrov, Goleta, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 926 days.

(21) Appl. No.: 12/751,023

(22) Filed: Mar. 31, 2010

(65) Prior Publication Data

US 2011/0246761 A1    Oct. 6, 2011

(51) Int. Cl.
| H04B 1/66 | (2006.01) |
| H04N 7/12 | (2006.01) |
| H04N 11/02 | (2006.01) |
| H04N 11/04 | (2006.01) |
| H04N 21/45 | (2011.01) |
| H04N 21/4402 | (2011.01) |
| H04L 9/00 | (2006.01) |
| H04N 21/4788 | (2011.01) |

(52) U.S. Cl.
CPC ....... *H04N 21/4788* (2013.01); *H04N 21/4516* (2013.01); *H04N 21/4402* (2013.01); *H04L 9/00* (2013.01); *H04L 2209/60* (2013.01)
USPC .................................................. 375/240.01

(58) Field of Classification Search
CPC . H04N 7/50; H04N 7/26271; H04N 7/26244; H04N 9/8042; H04N 5/85
USPC .................................................. 375/240.01
See application file for complete search history.

(56) References Cited

U.S. PATENT DOCUMENTS

| 5,553,083 A | 9/1996 | Miller |
| 5,715,404 | 2/1998 | Katseff et al. |
| 5,727,002 A | 3/1998 | Miller |
| 5,764,235 A | 6/1998 | Hunt et al. |
| 5,826,025 A | 10/1998 | Gramlich |
| 5,845,265 A | 12/1998 | Woolston |
| 5,956,027 A | 9/1999 | Krishnamurthy |

(Continued)

OTHER PUBLICATIONS

"CU-SeeMe Software Product," Brought to you by the Cu-SeeMe Development Team of the Advanced Technologies and Planning group of the Network Resources Division of Cornell Information Technologies, pp. 1-8 (1995).

(Continued)

*Primary Examiner* — Mehrdad Dastouri
*Assistant Examiner* — Kristin Dobbs
(74) *Attorney, Agent, or Firm* — BainwoodHuang

(57) ABSTRACT

A new approach is proposed that contemplates systems and methods to support distributed stream media transcoding and sharing in real time. Under the approach, a host associated with a sender generates a high quality stream of media content that is to be shared with a plurality of viewers over a communication network. The hosting devices associated with the plurality of viewers are evaluated for their capability to process and/or transcode the high quality media stream. Based on the evaluation, the host of the sender encodes and transmits the high quality media stream to at least one selected host associated a viewer. Besides decoding the received high quality media stream and displaying it for its own consumption, the selected host of the sender further transcodes the media stream by re-encoding the high quality media steam into a different, probably lower quality media stream, and transmits the re-encoded media stream to a mobile device associated with another viewer, which then decodes and displays the lower quality media stream on the mobile device.

18 Claims, 3 Drawing Sheets

(56) References Cited

U.S. PATENT DOCUMENTS

| | | | |
|---|---|---|---|
| 6,081,829 | A | 6/2000 | Sidana |
| 6,167,432 | A | 12/2000 | Jiang |
| 6,246,758 | B1 | 6/2001 | Low |
| 6,249,291 | B1 | 6/2001 | Popp et al. |
| 6,343,313 | B1 | 1/2002 | Salesky et al. |
| 7,013,327 | B1 | 3/2006 | Hickman et al. |
| 7,197,535 | B2 | 3/2007 | Salesky et al. |
| 7,310,675 | B2 | 12/2007 | Salesky et al. |
| 7,369,515 | B2 | 5/2008 | Salesky et al. |
| 7,418,476 | B2 | 8/2008 | Salesky et al. |
| 7,426,191 | B2 | 9/2008 | Salesky et al. |
| 7,593,987 | B2 | 9/2009 | Salesky et al. |
| 7,627,663 | B2 | 12/2009 | Salesky et al. |
| 7,715,331 | B2 | 5/2010 | Salesky et al. |
| 7,716,344 | B2 | 5/2010 | Salesky et al. |
| 7,813,304 | B2 | 10/2010 | Salesky et al. |
| 7,822,859 | B2 | 10/2010 | Salesky et al. |
| 7,836,163 | B2 | 11/2010 | Salesky et al. |
| 7,877,489 | B2 | 1/2011 | Salesky et al. |
| 7,934,002 | B2 | 4/2011 | Salesky et al. |
| 2003/0140159 | A1 | 7/2003 | Campbell |
| 2006/0087553 | A1* | 4/2006 | Kenoyer et al. ............ 348/14.08 |
| 2009/0019367 | A1* | 1/2009 | Cavagnari et al. ............ 715/716 |
| 2010/0306674 | A1 | 12/2010 | Salesky et al. |
| 2012/0102111 | A1* | 4/2012 | Salesky et al. ................ 709/204 |

OTHER PUBLICATIONS

"ORCA Video Conferencing System", Manual Written by the National Oceanic and Atmospheric Administration's Office of Ocean Resources Conservation and Assessment for Operation of the CU-SeeMe System, 26 pages (1995).

Abdel-Waha et al., "XTV: A Framework for Sharing X Window Clients in Remote Synchronous Collaboration," IEEE Conference, pp. 1-15 (1991).

Chen et al., "Real Time Video and Audio in the World Wide Web", 1995.

Bolot et al., "Scalable Feedback Control for Multicast Video Distribution in the Internet," SIGCOMM 94, London England, pp. 58-67 (1994).

Cox, "Global Schoolhouse Project," http://www.virtualschool.edu/mon/academia (2010).

Crowley et al., "MMConf: An Infrastructure for Building Shared Multimedia Applications," Proceedings of the 1990 ACM Conference on Computer—Supported Cooperative Work, pp. 329-342 (1990).

Delgrossi et al., "Media Scaling for Audiovisual Communication with the Heidelberg Transport System," Conference Proceedings of the first ACM International Conference on Multimedia, pp. 99-104 (1993).

Dorcey, "CU-SeeMe Desktop Videoconferencing Software," Connexions The Interoperability Report, 9: 42-45 (1995).

Ensor et al., "Control Issues in Multimedia Conferencing," IEEE Conference, pp. 133-143 (1991).

Ensor et al., "The Rapport Multimedia Conferencing System—A Software Overview," Proceedings of the 2nd IEEE Conference, pp. 52-58 (1988).

Maly et al., "Mosaic + XTV = CoReview," Computer Networks and ISDN Systems, pp. 1-19 1995.

McCanne et al., "Receiver-Driven Layered Multicast," ACM SIGCOMM, pp. 1-14 (1996).

Sattler, "Internet TV with CU-SeeMe", Book, 323 pages (1995).

Savetz et al., "MBONE: Multicasting Tomorrow's Internet," IDG Books Worldwide, Inc., (1996).

U.S. Appl. No. 09/523,315, filed Mar. 10, 2000, Salesky.

U.S. Appl. No. 60/014,212, filed Mar. 26, 1996, Salesky.

* cited by examiner

SYSTEMS AND METHODS FOR DISTRIBUTED MEDIA STREAM TRANSCODING AND SHARING

BACKGROUND

Increasingly, stream media content, which in addition to textual images (such as simple text), static images (such as solid background and continuous-tone images), may contain one or more media streams, including but not limited to audio clips, video clips, animation or simulation applications, real-time screensharing of content rendered on a screen, and any media that is dynamic in nature and changes constantly over time. Such stream media content can be generated by a sender and shared with a plurality of viewers over a communication network, where each of the sender and the viewers is associated with a hosting device (host) that is capable of transmitting, receiving, processing, and displaying the stream media content in real time.

In certain scenarios, the hosting devices involved in media streaming are homogenous, having roughly comparable capabilities such as CPU speed, memory, screen resolution, bandwidth. For example, when the hosting devices are desktop computers or laptops, they have roughly comparable capabilities. In such a situation, the sender can generate a single (high-quality/resolution) media stream and all viewers would be capable of receiving it and displaying it. For example, for streaming of videos, this could mean 30 frames per second at 1920×1080 resolution encoded at 10 Megabits per second of bandwidth. With the recent rapid proliferation of mobile phones and other less powerful computing devices, however, there is a need to support heterogeneous systems where hosting devices of some of the viewers have much weaker capabilities and are unable to receive and display the same high-quality media stream as the hosting devices of more powerful viewers can. On the other hand, hosting devices running web-based applications written in JavaScript or Adobe Flash® inside a browser are much slower than native application written in C++ and are another example of slow "devices". Such slow hosting devices may have limited CPU power, limited memory, limited bandwidth, limited screen resolution, limited battery life, or limited set of supported media codecs that restrict them, for a non-limiting example, to be only able to display a video media stream at 15 frames per second and 320×240 resolution encoded at 100 Kilobits per second of bandwidth.

One approach to supporting two (or more) classes of hosting devices would be to use the least common denominator and have the sender produce the lowest-quality media stream that even the least powerful viewer hosting device can consume. However, a better approach is to find a way to deliver two (or more) media streams for the same content—a high-quality media stream for the powerful viewer hosting devices and a lower-quality media stream to the slower viewer hosting devices.

There are several potential approaches to providing two media streams. Probably the most obvious approach is to utilize a transcoding server between the sender's device and the viewer's devices. The sender's device produces a single high quality media stream suitable for the fast viewer devices (e.g., desktop viewers) and sends it to a transcoding server. The transcoding server decodes the high-quality media stream and then re-encodes it to produce a low quality media stream suitable for the slow viewer devices (e.g., mobile phones). This is a natural approach since one-to-many media streaming solutions typically already require a communication server that receives the media stream from the one sender and retransmits it to the many viewers (relying on the sender to directly deliver the media stream to the viewers does not scale since it puts very heave bandwidth requirements on the sender's bandwidth). One disadvantage of such an approach is that it requires a powerful server capable of carrying out the transcoding work. A much bigger fundamental disadvantage, however, is that it requires the transcoding server to be able to manipulate the media stream. This does not work when the sender and the viewers encrypt all communications among themselves (end-to-end encryption) and for security reasons do not trust any intermediate server to decode the media stream. This is an important issue for Software-as-a-Service (SaaS) products, where the servers are operated by the SaaS provider and for maximum security should not be capable of seeing (spying on) the media stream which may contain confidential information of their customers.

A second approach that works with end-to-end encryption is for the sender's device itself to produce both the high-quality media stream and the low-quality media stream. Such an approach, however, requires extra processing power and extra outgoing bandwidth which may not be available at the sender's device, and this problem gets worse if there are three or more classes of devices. A third approach is to adopt a layered codec to generate a base media stream and an enhanced media stream for the media content, wherein only the base stream is sent to the mobile phone viewer, while the enhanced media stream is also sent to the desktop viewers. The base stream can then be integrated with the enhanced stream for desktop viewers capable of handling high quality media streams. Such layered codec can alleviate the issues of the first approach, however, it does not eliminate them since it also requires extra processing power and extra bandwidth from sender's device, just to a smaller degree that the second approach.

Besides discrepancies in processing capacity and/or bandwidth, the sender's device and the viewer's devices may support different types of codecs for encoding and decoding of the media streams. For a non-limiting example, Adobe Flash® supports only specific audio and video codecs that may be either suboptimal or unsupported for the desktop viewers.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support distributed stream media transcoding and sharing in real time. Under the approach, a host associated with a sender generates a high quality stream of media content that is to be shared with a plurality of viewers over a communication network. The hosting devices associated with the plurality of viewers are evaluated for their processing power, communication bandwidth, and other media stream-related characteristics and needs. Based on the evaluation, the hosting device of the sender encodes and transmits the high quality media stream to at least one selected hosting device associated a viewer. Besides decoding the received high quality media stream and displaying it for its own consumption, the selected host of the viewer further transcodes the media stream by re-encoding the media steam into a different, probably lower quality media stream, and transmits the re-encoded media stream to a mobile device associated with another viewer, which then decodes and displays the lower quality media stream on the mobile device. By utilizing a viewer's powerful host that has unused processing power and communication bandwidth to transcode a media stream suitable for a mobile device with limited processing power and bandwidth, the approach generates secured (end-to-end encrypted) multiple media streams suited for various needs of viewers and the capability of their hosts without imposing additional burden on the processing power and bandwidth of the sender's host or utilizing a dedicated transcoding or communication server. Although such distributed media transcoding benefits viewer devices with slow CPU and/or low bandwidth, the approach applies in general to any situation where for whatever reason the viewers are of two or more distinct types that require two or more distinct feeds of media streams.

Figure 1:
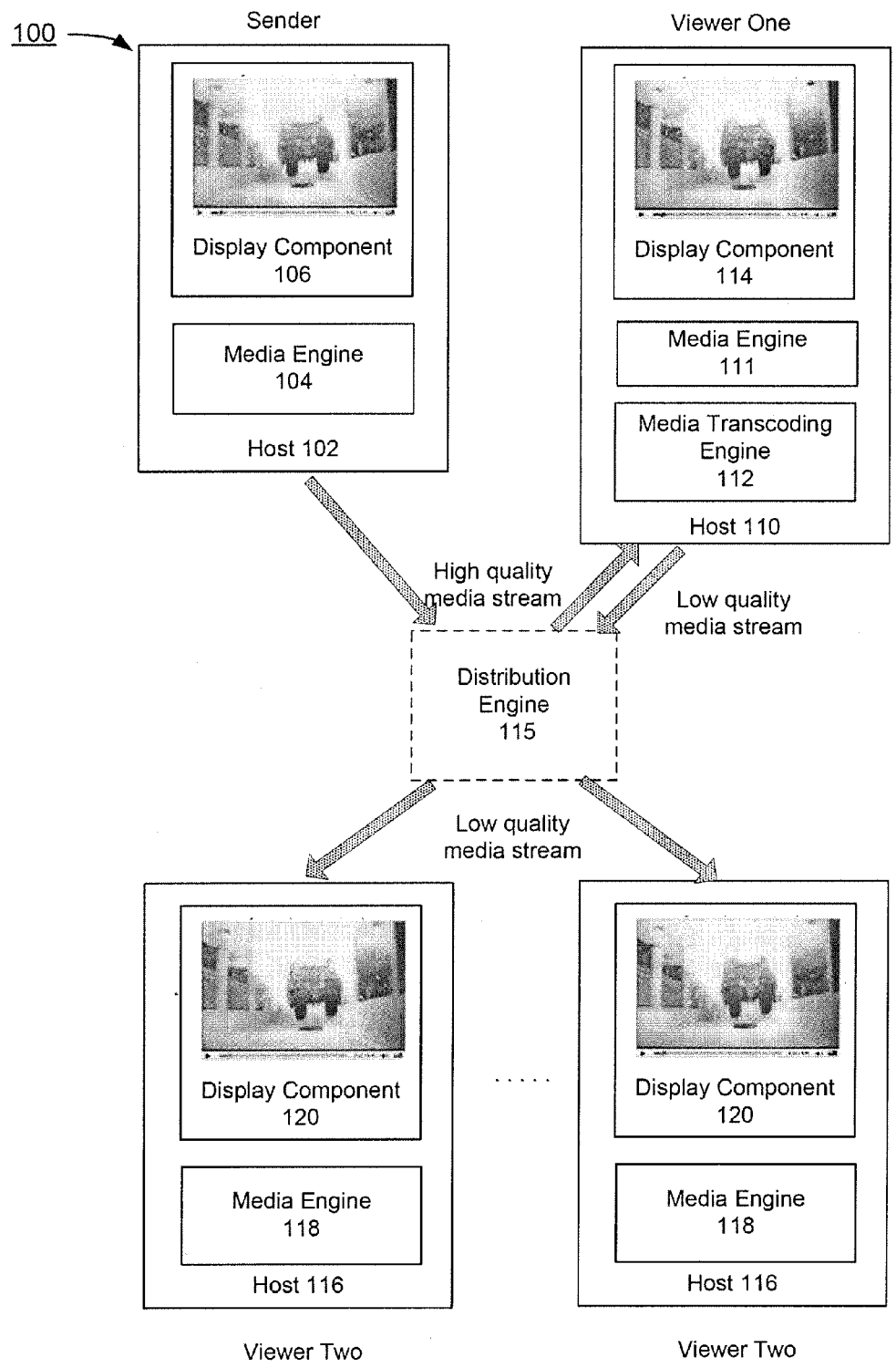
FIG. 1 depicts an example of a diagram of system to support distributed stream media transcoding and sharing.

FIG. 1 depicts an example of a diagram of system 100 to support distributed stream media transcoding and sharing. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a host 102 associated with a sender, wherein the host 102 includes at least a media engine 104 and a display component 106. The system 100 further includes a host 110 associated a first viewer, wherein the host 110 includes at least a media engine 111, a media transcoding engine 112 and a display component 114. The system 100 also includes an optional distribution engine/server 115, and one or more hosts 116 associated with a plurality of second viewers, wherein each host 116 includes at least a media engine 118 and a display component 120.

As used herein, the term "engine" or "component" refers to a software, firmware, hardware, or other component that is used to effectuate a purpose. The engine or component will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, each of the hosts/hosting devices running the engines and the components can be a computing device, a communication device, a storage device, or any electronic device capable of running a software component. For non-limiting examples, a computing device can be but is not limited to, a laptop PC, a netbook PC, a desktop PC, a tablet PC, an iPod, a PDA, or a server machine. A storage device can be but is not limited to a hard disk drive, a flash memory drive, or any portable storage device. A communication device can be but is not limited to a mobile phone or a smartphone, such as iPhone or Palm Pre.

In the example of FIG. 1, the hosts associated with the viewers can be characterized into two types based on their capabilities (such as processing power, network bandwidth, supported codecs): powerful host 110 associated with Viewer One, which is fast enough to transcode an incoming media stream and has enough bandwidth to send out the transcoded media stream, and relatively slow hosts 116 associated with one or more Viewer Twos, which only have enough processing power and bandwidth to handle a specially transcoded media stream. For non-limiting examples, Viewer One can be running on a desktop computer, while Viewer Two can be running on a mobile phone.

In the example of FIG. 1, the display components 106, 114, and 120 running on each of the hosts 102, 110, and 116, respectively, enable the sender and the viewers to display and share the media streams of the same content. Here, the display component 110 can be a monitor, a screen, or any other displaying device associated with the hosts known to one skilled in the art.

In the example of FIG. 1, the hosts 102, 110, 116 and the distribution engine 115 can communicate and interact with each other via communication interfaces (not shown) following certain communication protocols, such as TCP/IP protocol, over a network (not shown). Here, the network can be a communication network based on certain communication protocols, such as TCP/IP protocol. Such network can be but is not limited to, internet, intranet, wide area network (WAN), local area network (LAN), wireless network, Bluetooth, WiFi, and mobile communication network. The physical connections of the network and the communication protocols are well known to those of skill in the art.

In the following discussions, video is often used as an example of media stream to illustrate the proposed systems and methods. It is known to one skilled in the art that similar approaches can also be applied to other types of media streams, which include but are not limited to, audio, animation or simulation application, and real-time screensharing of content.

In the example of FIG. 1, the media engine 104 running on host 102 associated with Sender is operable to generate a type one (e.g. high quality) media stream (e.g., for video this can mean 640×480 resolution and above, and 15-30 frames per second), which can be displayed on the display component 106 of the host 102. For non-limiting examples, such media stream can be captured by the media engine 104 from a media file being played back on host 102, or alternatively, screen scraped by the media engine 104 from a media/animation/simulation embedded in a application (such as a PowerPoint presentation) or a web page (such as YouTube) running on host 102. Once generating the high quality media stream, the media engine 104 then encodes/compresses the high quality media stream with its own compression approaches and parameters, before the encoded data is transmitted over the communication network directly or indirectly (via a distribution engine as discussed later) to one or more hosts associated with the viewers. More specifically, the media engine 104 utilizes a media/video codec, such as JPEG, H.263, H.264, Motion JPEG, On2's VP6, VP7 and VP8, to perform high resolution lossless or lossy (e.g., 80% of the original quality of the media stream) and fast (e.g., 15 fps) compression on the media stream so that the remote viewers at the receiving end are able to see a continuous and clear media stream without glitches. Here, the exact codec and compression parameters adopted by media engine 104 depend on the processing power of host 102 running the media engine 104 and/or the uploading bandwidth of the communication network.

In some embodiments, the media engine 104 may utilize multiple media codecs, each operable to process and compress a specific type of media stream using its own compression approach and compression parameters, such as image resolution or color mapping. In some embodiments, the media engine 104 may encrypt the high quality media stream with certain encryption methods and keys agreed upon with the media engines of the hosts associated with the viewers for secured network communication, e.g., so that the media stream cannot be observed by the SaaS provider as it passes through the SaaS provider's cloud of servers.

The system depicted in the example of FIG. 1 may operate under the following three scenarios:

- If there are only host 102 associated with the Sender and powerful host 110 associated with Viewer One, media engine 104 running on host 102 produces the high quality media stream for the host 110 to consume and there is no need for transcoding.
- If there are only host 102 and associated with the Sender and slow hosts 116 associated with one or more Viewer Two, media engine 104 running on host 102 produces a low quality media stream for the hosts 116 to consume and there is no need for transcoding either.
- If host 102 associated with the Sender, powerful host 110 associated with Viewer One, and slow hosts 116 associated with one or more Viewer Two all exist in the system 100, there is a need for transcoding by the media transcoding engine 112 running on host 110 as discussed in details below.

In the example of FIG. 1, the host 110 of Viewer One has enough processing power to not only process the type one (e.g. high quality) media stream received from the host 102 for its own consumption via media engine 111, but also to transcode the type one media stream for other hosts that can only handle a type two (e.g., lower quality) media stream via media transcoding engine 112. The host 102 also has enough spare outgoing bandwidth available to send out the lower quality media stream. Upon receiving the high quality media stream received from the host 102, the media engine 111 first decodes the high quality media stream via a media codec and displays the decoded media stream on its display component 114. If the media stream is encrypted, the media engine 111 needs to decrypt the media stream first. The media transcoding engine 112 then re-encodes the incoming media stream at a lower quality (e.g., for video this can be 320×240 resolution, and a lower frame rate of 5 frames per second), before transmitting the transcoded media stream to the host 116 directly or indirectly via a distribution engine. The media transcoding engine 112 may then encrypt the low quality media stream, which is later decrypted only by the media engine 118 of hosts 116 of Viewer Two. Such transcoding greatly reduces the burden on processing power and bandwidth of host 116, enabling it to handle the transcoded media stream. Furthermore, it eliminates the need for a dedicated transcoding server, which as discussed before, cannot process end-to-end encrypted communication between a sender and a viewer.

Note that in addition to transcoding a high quality media stream to a low quality media stream, media transcoding engine 112 may also transcode one media stream to another media stream of the same quality but differently encoded.

In the example of FIG. 1, an optional distribution/communication engine/server 115 may be utilized to broadcast, the media stream from the sender to the viewers. More specifically, the distribution engine 115 first accepts the sender's high quality media stream from media engine 104 and provides the high quality media stream to media engine 111 associated with Viewer One. Once media transcoding engine 112 generates the low quality media stream, the low quality media stream is provided to the distribution engine 115, which then distributes/broadcasts the low quality media stream to one or more hosts 116 associated with Viewer Twos. Such dedicated distribution server is especially suited for the situation where there exist a large number of mobile users associated with hosts 116, e.g., hundreds or even thousands of them, and it is impractical or convenient for the media transcoding engine 112 to transmit the low quality media stream to each of them. Note that the distribution engine 115 cannot decrypt any of the media stream received or encrypt any of the media stream broadcasted.

In the example of FIG. 1, the media engine 118 running on the host 116 of Viewer Two accepts the transcoded low quality media stream directly from media transcoding engine 112 or indirectly from distribution engine 115, decodes the media stream, and displays the media stream to Viewer One on display component 120. Here, the host 116 can be mobile device, which has slower CPU, less memory, and/or less bandwidth than host 110, but still has enough processing power to handle the transcoded low quality media stream. Under the scenario where multiple media transcoding engines 112 each providing a portion of the transcoded media stream to the media engine 118, the media engine 118 decodes each portion of the transcoded media stream separately, and further reconstructs the media stream in its entirety for display on the display component 120 by placing each portion of the decoded stream at its proper position in the stream.

While the system 100 depicted in FIG. 1 is in operation, the media engine 104 running on host 102 of a sender generates and encodes a high quality media stream at a high resolution and at a high capturing rate for sharing with a plurality of viewers. The media engine 104 transmits the encoded high quality media stream either directly or through distribution engine 115 only to those one or more hosts 110 that have enough processing power and bandwidth to transcode the media stream. The media engine 111 of each host 110 decodes and displays the high quality media stream from the media engine 104, and the media transcoding engine 112 re-encodes at least a portion of the media stream into a lower quality media stream at a lower resolution and capturing rate so that it can be processed by the host 116. The transcoded low quality media stream is then provided either directly or broadcasted via distribution engine 115 to the media engine 118 running on each of a plurality of hosts 116, which can be mobile devices. The media engine 118 on each host 116 decodes the transcoded low quality media stream and displays it on the display component 120 of the host 116.

Figure 2:
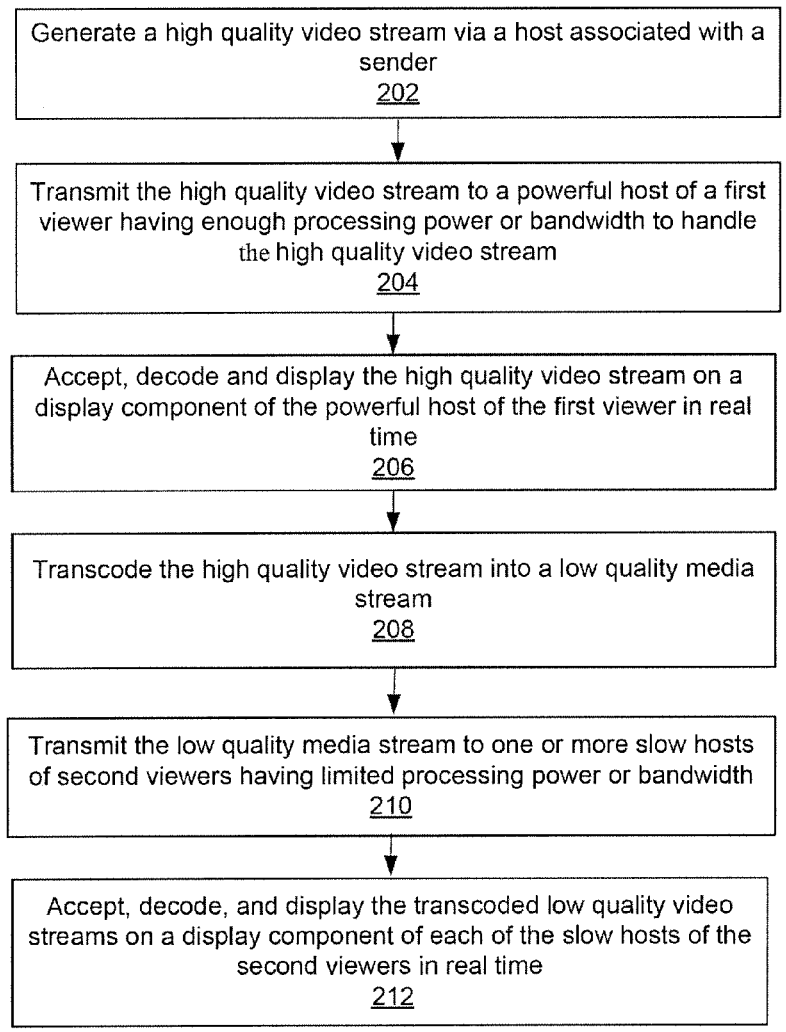
FIG. 2 depicts a flowchart of an example of a process to support distributed stream media transcoding and sharing in accordance with FIG. 1.

FIG. 2 depicts a flowchart of an example of a process to support distributed stream media transcoding and sharing in accordance with FIG. 1. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where a high quality media stream is generated and encoded via a host associated with a sender. The flowchart 200 continues to block 204 where the encoded high quality media stream is transmitted to a powerful host of a first viewer having enough processing power or bandwidth to handle the high quality video stream. The flowchart 200 continues to block 206 where the encoded high quality media stream is accepted, decoded and displayed on a display component of the powerful host of the first viewer in real time. The flowchart 200 continues to block 208 where the high quality media stream is transcoded into a low quality media stream by the powerful host. The flowchart 200 continues to block 210 where the low quality media stream is transmitted to one or more slow hosts of second viewers having limited processing power or bandwidth. The flowchart 200 ends at block 212 where the low quality media stream is accepted, decoded, and displayed on a display component of each of the slow hosts of the second viewers in real time.

Figure 3:
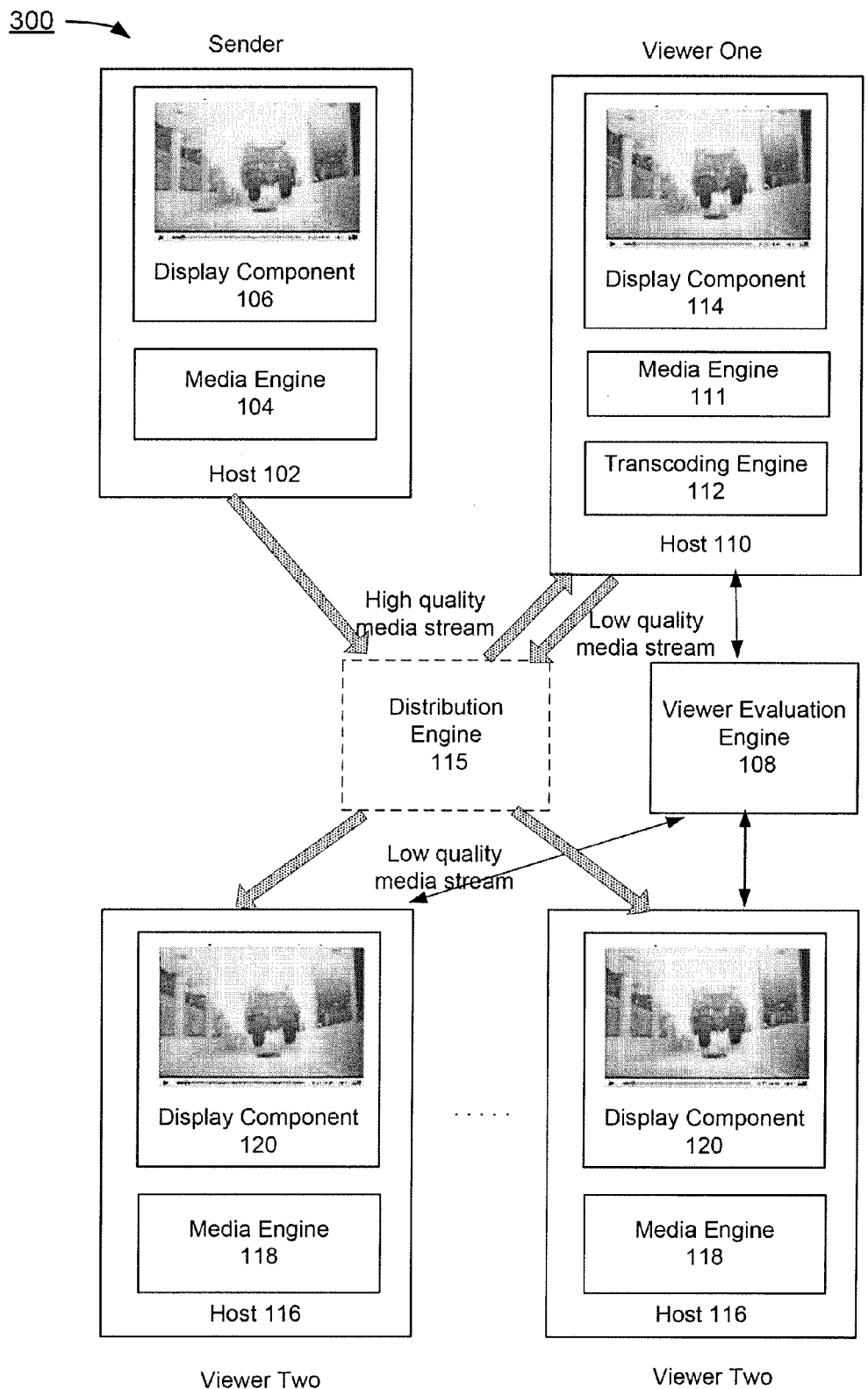
FIG. 3 depicts an example of an alternative embodiment of a system to support distributed stream media transcoding and sharing.

FIG. 3 depicts an example of a system 300 to support distributed stream media transcoding and sharing. Compared to FIG. 1, the example depicted in FIG. 1 further comprises a viewer evaluation engine 108, which monitors and evaluates the capabilities (e.g., processing powers and communication bandwidth) of a plurality of hosts 110s and 116s each associated with a viewer destined to receive the media stream generated by the host 102 associated with the sender. Although shown as a separate entity, the viewer evaluation engine 108 can be a part of host 102 of the sender, a part of the distribution engine 115, or be a distributed logic running across all hosts of the sender and the viewers.

In the example of FIG. 3, the viewer evaluation engine 108 monitors at least both static information and dynamic information of the capabilities of each of the hosts, where the static information includes but is not limited to processing power (speed) of the CPU, size of volatile memory, size of non-volatile memory, and supported codecs, as well as the upstream and downstream communication bandwidths of each the hosts, while the dynamic information includes but is not limited to current load on CPU, memory, and network bandwidths of each of the hosts. Based on the static and dynamic information collected, the viewer evaluation engine 108 first determines if there exists a host 116 that does not have the capabilities to handle the high quality media stream, such as a mobile phone. If such host 116 exists, the viewer evaluation engine 108 further identifies if there exists another host 110 that currently has enough processing power and bandwidth not only to process the high quality media stream, but also to transcode the high quality media stream to a different (probably lower) quality media stream and provide such media stream to host 118 that cannot handle the high quality media stream. Note that the viewer evaluation engine 108 may identify more than one host 116 that can only handle a low quality media stream and more than one host 110 that can transcode to other hosts. The viewer evaluation engine 108 then provides such information of the plurality of hosts of the viewers to host 102.

Based on the information of the hosts of the viewers provided by the viewer evaluation engine 108, the media engine 104 running on host 102 of the sender may transmit the high quality media stream directly to all of the hosts of the viewers, if all of the hosts the capabilities to handle the high quality media stream, or alternatively, transmit the high quality media stream directly only to those hosts having the capabilities to handle such media stream and leave the transcoding of the high quality media stream to those hosts 110.

In some embodiments, the viewer evaluation engine 108 may identify more than one hosts 110 each having more than enough processing power and/or bandwidth to handle the high quality media stream for its own consumption, but none having enough processing power and/or bandwidth to transcode the high quality media stream alone. Under such scenario, the media engine 104 on host 102 may provide the high quality media stream to a plurality of hosts 110, while the media transcoding engines 112 running on those hosts may each transcode a portion of the high quality media stream to a lower quality media stream. Each of these media transcoding engines 112 may then transmit only the portion of the low quality media streams, e.g., for video, one engine transmits half of the frames, while the other engine transmits the other half of the frames, to the media engine 118 of host 116. Utilizing multiple media transcoding engines further alleviates the burden on processing power and bandwidth of each of the host 110.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system, comprising:
a first media engine running on a host associated with a sender, which in operation,
generates and encodes a type one media stream;
transmits the encoded type one media stream to a distribution engine;
a plurality of first hosts associated with first viewers, each first host associated with each first viewer comprising:
a second media engine running on each first host associated with each first viewer, which in operation, accepts, decodes, and displays the type one media stream to the first viewer in real time;
a media transcoding engine running on each first host associated with each first viewer, which in operation, transcodes a portion of the type one media stream into a portion of a type two media stream, wherein the type one media stream is subdivided into a plurality of portions, each portion of the type one media stream being assigned to one first host associated with one first viewer, the portion of the type one media stream being one of the plurality of portions;
transmits the portion of type two media stream to the distribution engine;
said distribution engine, which in operation,
accepts and provides the portions of type one media stream to second media engine of the first host associated with the first viewer in real time;
accepts and broadcasts the portions of the type two media stream from the media transcoding engine running on each first host associated with the first viewer to one or more second hosts associated with one or more second viewers;
a third media engine running on each of the second hosts associated with the second viewers, which in operation, accepts, decodes, and displays the portions of the type two media stream to the second viewer in real time; and
a viewer evaluation engine, which in operation,
receives processing power and bandwidth information of a plurality of hosts, the plurality of hosts comprising the plurality of first hosts associated with the plurality of first viewers and the second host associated with the second viewer;
identifies, based on the received processing power and bandwidth information of the plurality of hosts, the second host associated with the second viewer, and determines that the second host has enough processing power and bandwidth to process the portions of the type two media stream and lacks enough processing power and bandwidth to process the type one media stream; and
identifies, based on the received processing power and bandwidth information of the plurality of hosts, the plurality of first hosts associated with the first viewers, and determines that each first host has enough processing power and bandwidth to process the type one media stream and to transcode at least one portion of the type one media stream to the portion of the type two media stream and that each first host lacks enough processing power and bandwidth to transcode the entire type one media stream to the entire type two media stream.

2. The system of claim 1, wherein:
each host associated with the sender or the viewers is a computing device, a communication device, a storage device, or any electronic device capable of running a software component.

3. The system of claim 1, wherein:
the media stream is one of audio clip, video clip, animation or simulation application, sharing of content rendered on a screen, and any media that is dynamic in nature and changes constantly over time.

4. The system of claim 1, wherein:
the media stream is real time sharing of content rendered on a screen.

5. The system of claim 1, wherein:
the second host associated with the second viewer is a mobile computing and/or communication device.

6. The system of claim 1, wherein:
the viewer evaluation engine monitors both static information and dynamic information of the each of the plurality of hosts associated with the viewers.

7. The system of claim 6, wherein:
the static information includes one or more of processing power of CPU, size of volatile memory, size of non-volatile memory, upstream and downstream communication bandwidths of each of the hosts associated with the viewers.

8. The system of claim 6, wherein:
the dynamic information includes one or more of current loads on CPU, memory, and network bandwidths of each of the hosts associated with the viewers.

9. The system of claim 1, wherein:
the first media engine utilizes one or more media codecs to encode the type one media stream.

10. The system of claim 1, wherein:
the first media engine encrypts the encoded type one media stream before transmitting the encrypted type one media stream so that the hosts of the viewers can decrypt the encrypted type one media stream, and the distribution engine cannot decrypt the encrypted type one media stream.

11. The system of claim 10, wherein:
the second media engine decrypts the encrypted type one media stream before decoding the encrypted type one media stream.

12. The system of claim 11, wherein:
the media transcoding engine encrypts the portions of the type two stream; and
the third media engine decrypts the encrypted portions of the type two stream.

13. A computer-implemented method, comprising:
generating and encoding a type one media stream;
transmitting the type one media stream to a plurality of first hosts of first viewers having enough processing power or bandwidth to handle the type one media stream;
accepting, decoding, and displaying the type one media stream to each first viewer in real time;
transcoding, at each first host, a portion of the type one media stream into a portion of a type two media stream, wherein the type one media stream is subdivided into a plurality of portions, each portion of the type one media stream being assigned to one first host associated with one first viewer, the portion of the type one media stream being one of the plurality of portions;
transmitting the transcoded portions of the type two media stream for distribution;
broadcasting the transcoded portions of the type two media stream to one or more second hosts associated with one or more second viewers having enough processing power or bandwidth to handle the portions of the type two video stream;

accepting, decoding, and displaying the broadcasted portions of the type two media stream to each of the one or more second viewer in real time;

receiving processing power and bandwidth information of a plurality of hosts, the plurality of hosts comprising the plurality of first hosts associated with the first viewers and the second host associated with the second viewer;

identifying, based on the received processing power and bandwidth information of the plurality of hosts, the one or more second hosts associated with the one or more second viewers, and determining that the one or more second hosts have enough processing power and bandwidth to process the portions of the type two media stream and lack enough processing power and bandwidth to process the type one media stream; and identifying, based on the received processing power and bandwidth information of the plurality of hosts, the plurality of first hosts associated with the first viewers and determining that each first host has enough processing power and bandwidth to process the type one media stream and to transcode at least one portion of the type one media stream to the type two media stream and that each first host lacks enough processing power and bandwidth to transcode the entire type one media stream to the entire type two media stream.

14. The method of claim 13, further comprising:
monitoring one or more of processing power of CPU, size of volatile memory, size of non-volatile memory, upstream and downstream communication bandwidths of each of the hosts associated with the viewers as well as current loads on the CPU, memory, and bandwidth of each of the hosts associated with the viewers.

15. The method of claim 13, further comprising:
utilizing one or more media codecs to encode the type one media stream.

16. The method of claim 13, further comprising:
encrypting the encoded type one media stream before transmitting the encrypted type one media stream so that the hosts of the viewers can decrypt the encrypted type one media stream, and the distribution engine cannot decrypt the encrypted type one media stream.

17. The method of claim 16, further comprising:
decrypting the encrypted type one media stream before decoding the encrypted type one media stream.

18. The method of claim 17, further comprising:
encrypting the portions of the type two stream; and
decrypting the encrypted portions of the type two stream.

* * * * *